(12) United States Patent
Anderson

(10) Patent No.: US 6,971,042 B2
(45) Date of Patent: Nov. 29, 2005

(54) MEDIA SERVER WITH SINGLE CHIP STORAGE CONTROLLER

(75) Inventor: Michael H. Anderson, Westlake Village, CA (US)

(73) Assignee: Huge Systems, Inc., Marina Del Rey, CA (US)

( * ) Notice: Subject to any disclaimer, the term of this patent is extended or adjusted under 35 U.S.C. 154(b) by 572 days.

(21) Appl. No.: 10/125,903

(22) Filed: Apr. 18, 2002

(65) Prior Publication Data

US 2003/0200478 A1 Oct. 23, 2003

(51) Int. Cl.[7] ............................................ G06F 11/00
(52) U.S. Cl. ......................................................... 714/6
(58) Field of Search ..................... 714/6, 5, 7; 711/114

(56) References Cited

U.S. PATENT DOCUMENTS

| | | | |
|---|---|---|---|
| 4,870,643 A | 9/1989 | Bultman et al. | |
| 5,191,584 A | 3/1993 | Anderson | |
| 5,519,435 A | 5/1996 | Anderson | |
| 5,790,176 A | 8/1998 | Craig | |
| 5,796,566 A | 8/1998 | Sharma et al. | |
| 5,805,919 A | 9/1998 | Anderson | |
| 5,825,630 A | 10/1998 | Taylor et al. | |
| 5,901,048 A | 5/1999 | Hu | |
| 5,909,430 A | 6/1999 | Reaves | |
| 5,913,028 A | 6/1999 | Wang et al. | |
| 5,938,744 A | 8/1999 | Roganti et al. | |
| 6,010,345 A | 1/2000 | Allen | |
| 6,047,319 A | 4/2000 | Olson | |
| 6,061,241 A | 5/2000 | Handforth et al. | |
| 6,067,636 A * | 5/2000 | Yao et al. ................. | 714/15 |
| 6,070,228 A | 5/2000 | Belknap et al. | |
| 6,108,695 A | 8/2000 | Chawla | |
| 6,112,246 A | 8/2000 | Horbal et al. | |
| 6,134,579 A | 10/2000 | Tavallaei et al. | |
| 6,138,144 A | 10/2000 | DeSimone et al. | |
| 6,144,549 A | 11/2000 | Moss et al. | |
| 6,148,142 A | 11/2000 | Anderson | |
| 6,155,840 A | 12/2000 | Sallette | |
| 6,157,534 A | 12/2000 | Gallagher et al. | |
| 6,170,021 B1 | 1/2001 | Graf | |
| 6,173,340 B1 | 1/2001 | Gready et al. | |

(Continued)

OTHER PUBLICATIONS

Tanenbaum, Andrew S., Structured Computer Organization, 1984, Publisher not given, 2nd Edition.*

(Continued)

*Primary Examiner*—Bryce P. Bonzo
*Assistant Examiner*—Marc Duncan
(74) *Attorney, Agent, or Firm*—Christie, Parker & Hale, LLP

(57) ABSTRACT

An improved data storage and retrieval system including a plurality of storage devices controlled by a storage controller. The storage controller includes an interface logic circuitry, a reconstruction logic circuitry, and a controller logic circuitry, all which reside within a single electronic chip. The storage controller receives a user request to retrieve data from the plurality of storage devices, identifies an unresponsive storage device, transmits a signal for reconstructing data associated with the unresponsive storage device, and reconstructs the data associated with the unresponsive storage device. The identifying, transmitting, and reconstructing of data associated with the unresponsive storage device occur in real-time via hardware mechanisms without the need to waste time in communicating and waiting for responses from components residing outside the chip. The data storage and retrieval system further includes a streaming engine including circuitry for automatically formatting in hardware data retrieved from the plurality of storage devices and transmitting the formatted data to a requesting user device, improving data transmission speeds.

18 Claims, 14 Drawing Sheets

U.S. PATENT DOCUMENTS

| | | |
|---|---|---|
| 6,202,170 B1 | 3/2001 | Busschbach et al. |
| 6,269,453 B1 * | 7/2001 | Krantz .......................... 714/6 |
| 6,625,750 B1 * | 9/2003 | Duso et al. ................... 714/11 |
| 6,789,165 B2 * | 9/2004 | Apperley et al. ........... 711/114 |
| 2002/0066050 A1 * | 5/2002 | Lerman et al. ................ 714/6 |

OTHER PUBLICATIONS

Tobagi, Fouad A., Joseph Pang, Randall Baird, Mark Gang, Streaming RAID—A Disk Array Management System for Video Files, Sep. 1993, Proceedings of the first ACM International conference on Multimedia.*

Dave, Bharat P., SYNSOC: Hardware-Software Co-Synthesis of Heterogeneous Low Power and Fault Tolerant Systems-on-a-Chip, 1999, Lucent Technologies, Inc., pp. 1-2.*

C440GX+ Server Board; C440GX + Server Board for Intel® Pentium® III Xeon(tm) Processors; web pages; http://www.intel.com/design/servers/c440gx/; pp. 1-4.

T440BX Server Board; web pages; http://www.intel.ie/design/servers/T440BX/; pp. 1-4.

Anderson, Michael H.; Strength (and Safety) in Numbers; Byte Magazine; Dec. 1990; pp. 337-339.

* cited by examiner

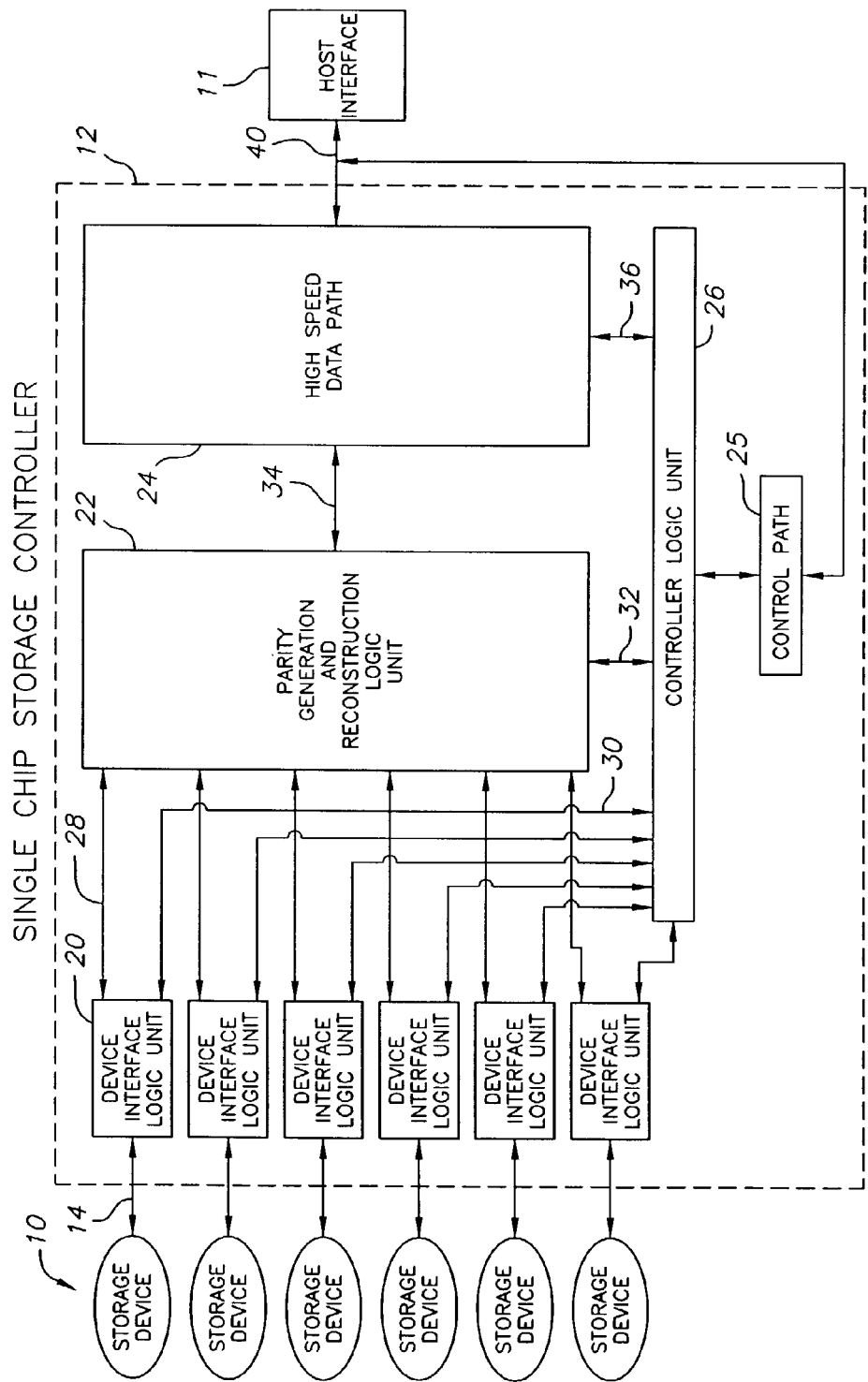

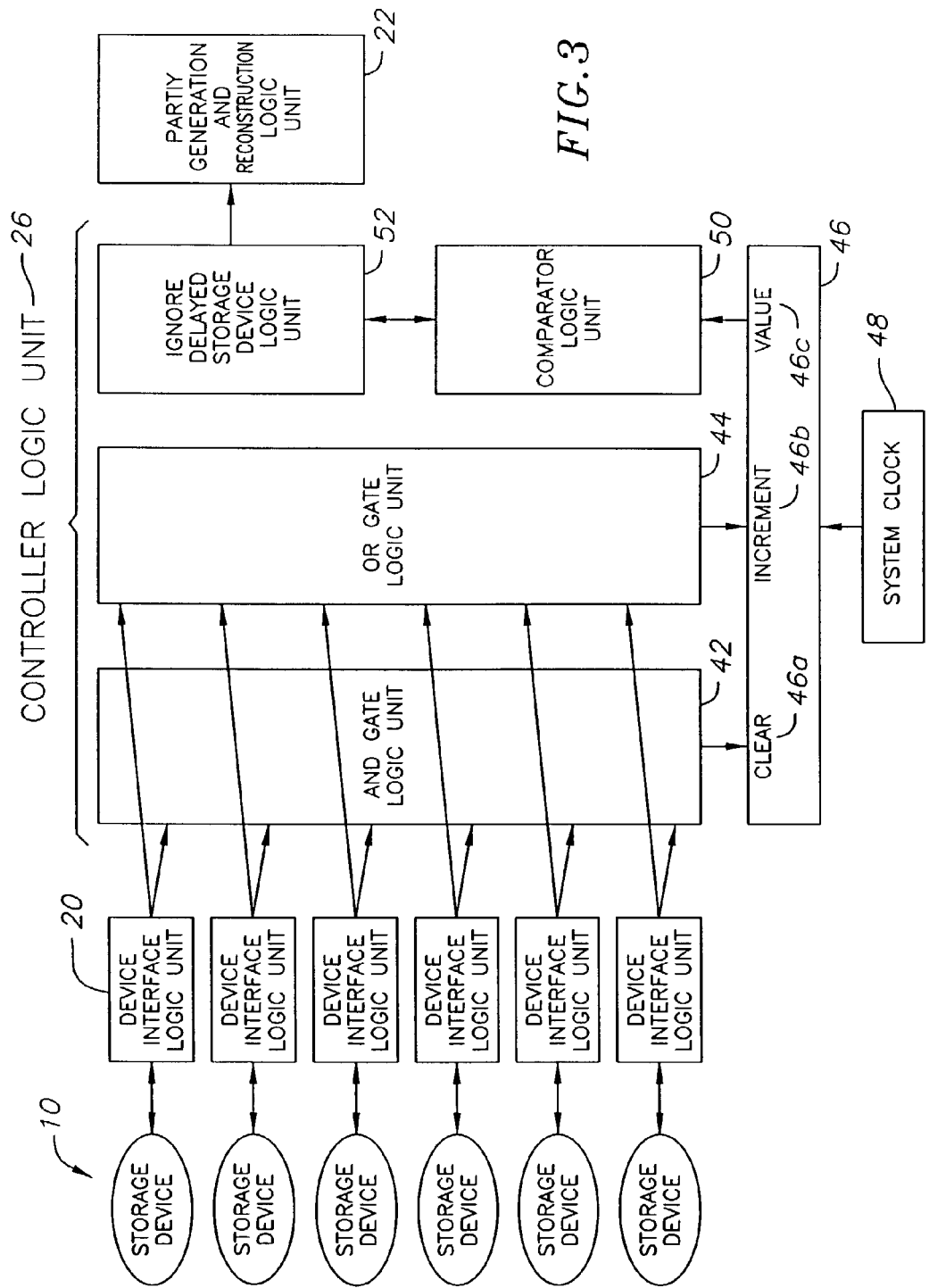

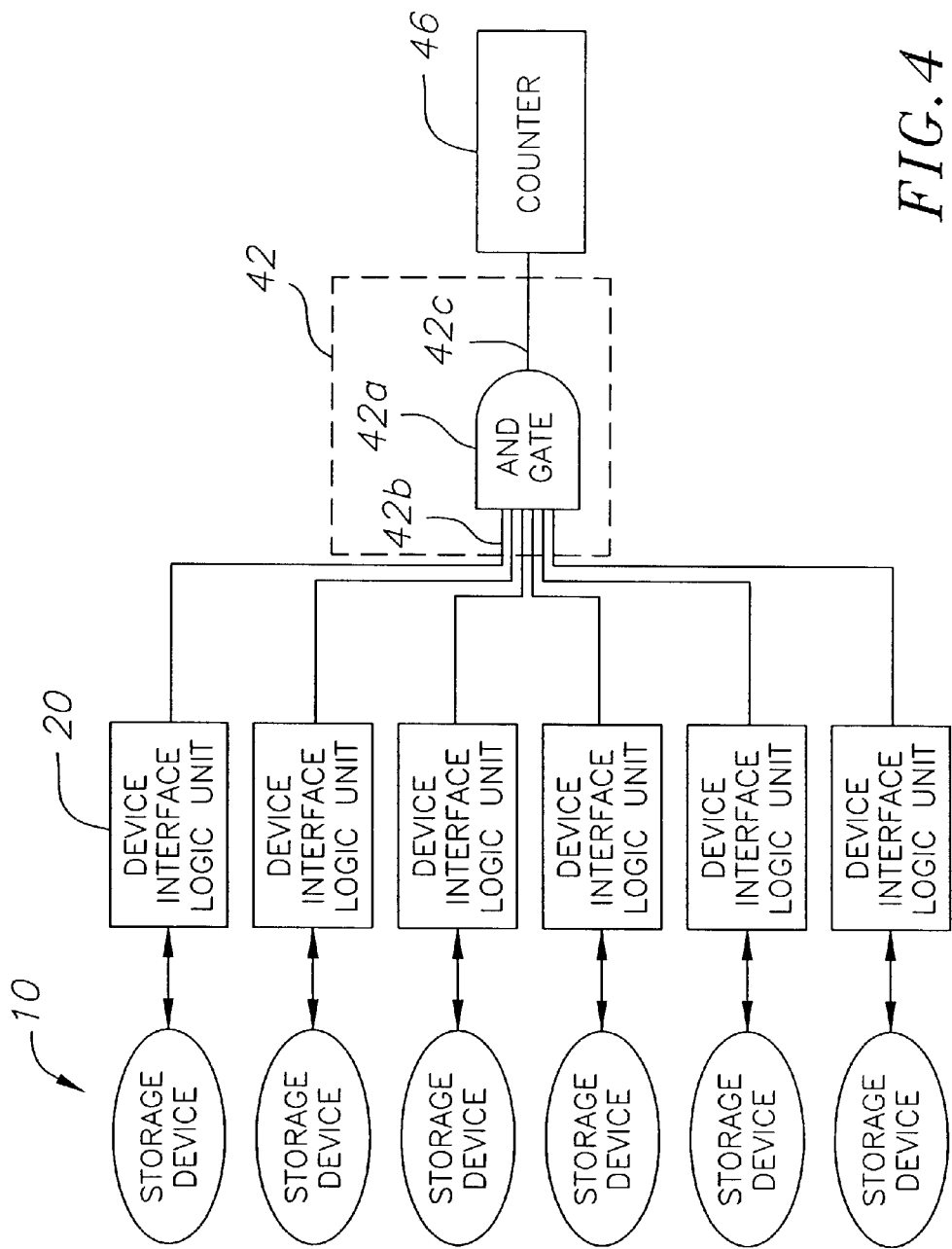

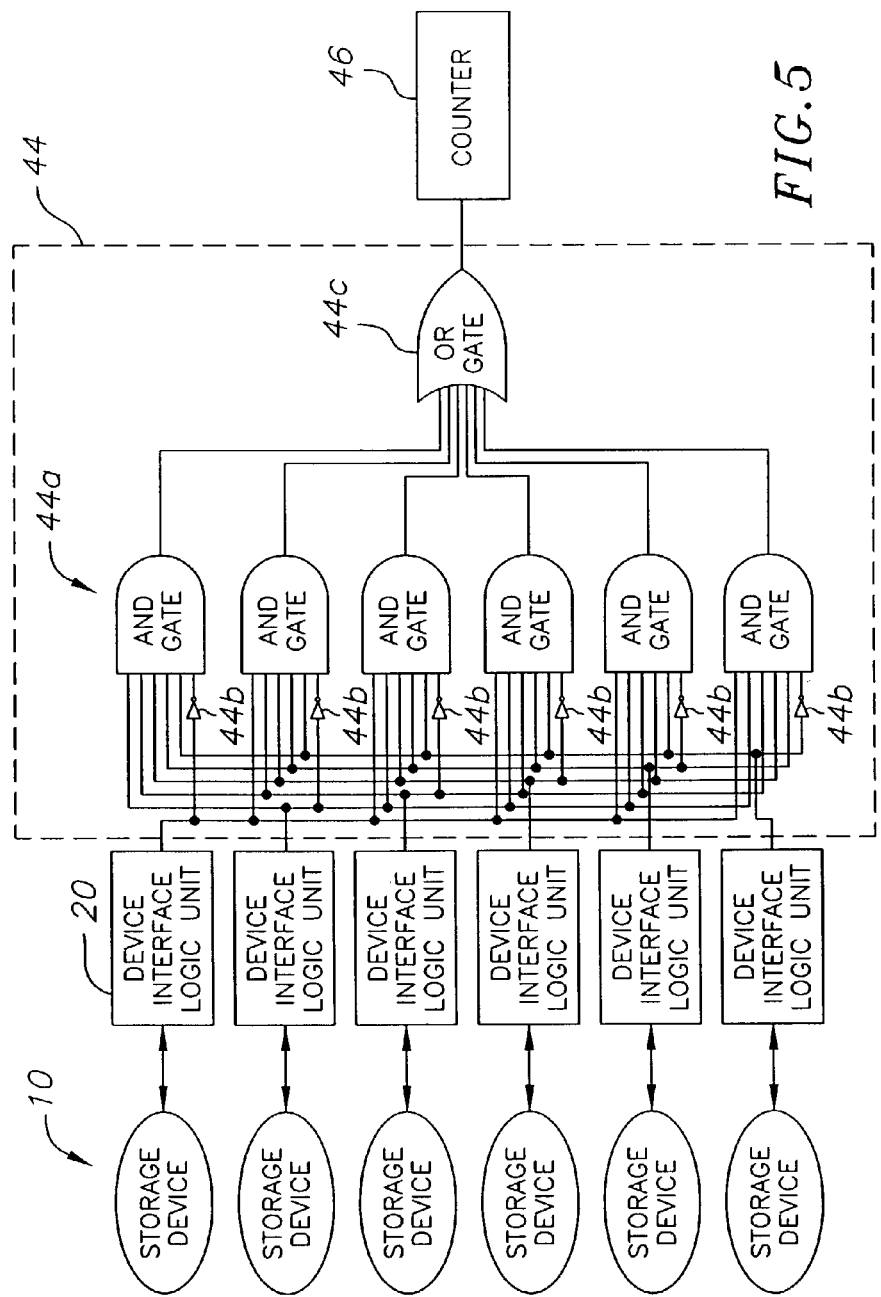

MEDIA SERVER WITH SINGLE CHIP STORAGE CONTROLLER

FIELD OF THE INVENTION

The present invention relates generally to file servers used in computer networks, and in particular, to media servers used for distributing multimedia electronic files to Internet users.

BACKGROUND OF THE INVENTION

Advances in the use of the Internet have increased the demands upon Internet servers to provide multimedia data files. These data files include digital representations of text, sound, photographs, animation, and video which are stored on servers called media-servers. As the Internet has evolved, the speed with which multimedia files must be transferred from media servers to Internet users has increased. This has thus resulted in the need for media servers that can quickly receive requests for data and respond with data transmission such that the media server does not become a bottleneck to the flow of data to Internet users.

Media servers are electrically-powered systems that typically include a plurality of storage devices capable of storing and retrieving data, i.e., disk drives, that are usually of the same type and capacity. The plurality of storage devices are under the control of a computer processor referred to as a storage controller. In many applications, the storage controller is a Redundant Array of Inexpensive Drives (RAID) controller, a storage controller which implements a RAID configuration. The basic RAID configuration is disclosed in U.S. Pat. No. 4,870,643, entitled "PARALLEL DRIVE ARRAY STORAGE SYSTEM," the content of which is incorporated herein by reference.

In general terms, the RAID controller interprets and controls data written to and read from an array of disk drives. Data is stored in the drives of the array in a "striped" arrangement. Each stripe includes a plurality of successive data bytes that are stored in the same numerical location of the drives. One of the drives may be used to store a check (parity) byte for each stripe such that the data for a storage device that has malfunctioned or is temporarily removed from service may be reconstructed, as is described in further detail in U.S. Pat. No. 5,191,584, entitled "MASS STORAGE ARRAY WITH EFFICIENT PARITY CALCULATION," the content of which is incorporated herein by reference.

One drawback with current storage controllers including RAID controllers is that they are implemented with multiple semiconductor chips. In a typical approach, an off-the-shelf control protocol chip is purchased together with a memory buffer chip and a parity engine chip, and combined together to create a storage controller. The various chips are interconnected via pins and a local bus to allow communication between the chips. The physical separation between the chips and their interconnection via physical pins and the bus interface generally results in processing and transmission delays, increased power consumption, and increased space consumption. Media servers having large power consuming storage controllers generally require additional cooling systems, power supplies, and associated monitoring systems. This results in further power consumption by the media server and increased manufacturing costs in the purchase and installation of multiple components.

For a typical RAID storage controller, its implementation via multiple chips may also cause delays in the detection and reconstruction of data of a failed disk drive. One distinguishing feature of media servers is the requirement to deliver data intended for real time use. One example of such a data is video data, which in the U.S. must typically be displayed at a fixed frame rate of usually 29.97 frames per second. In this environment, delays that may be of no consequence to a general computer application are considered failures by the media server. Such delays, however, may be common for disk drive mechanisms. Accordingly, it is desirable for the media server to efficiently identify and recover from delays caused by the disk drive mechanisms in order to prevent data transmission interruptions.

FIG. 1A is a schematic block diagram of a conventional RAID storage controller system that detects a failed disk drive and provides data reconstruction functionality. The system includes a plurality of disk drives 102, a protocol chip 100 associated with each disk drive, a memory buffer chip 104, a microprocessor chip 106, and a parity engine chip 108, which are all interconnected to each other and to a host computer 110 via a data communications bus 112. The plurality of disk drives 102 forms a RAID disk drive array. The microprocessor chip 106 determines particular locations of the disk drives for reading and writing a data stripe based on requests received from the host computer 110. The memory buffer chip 104 stores data read from the disk drives, and data to be written into the disk drives. The parity engine chip 108 includes logic for calculating check bytes via exclusive OR (XOR) functions. The check bytes are used in recreating data in a particular position of a failed disk drive in conjunction with the data stripe stored in the same position of other non-failed disk drives.

The reconstruction process of a failed disk drive in the storage controller system of FIG. 1A demands multiple transfers of data across the data communications bus 112 for accessing various chip components involved in the reconstruction process. In a typical scenario, four or more trips across the bus may be required. In this regard, a data stripe of the non-failed disk drives is read and transferred over the bus to the memory buffer 104. The data stripe is transferred again over the bus to the separate parity engine chip 108. The parity engine chip utilizes the data stripe to reconstruct the failed portion of the failed disk drive, and utilizes the bus to transfer the reconstructed stripe to the memory buffer 104. The memory buffer 104 then transmits the reconstructed stripe over the bus for writing the stripe to the disk drives including the failed disk drive. The reconstructed stripe may also be transmitted to the requesting host 110. The process continues until all the data stripes of the non-failed disk drives are read and the failed disk drive has been fully reconstructed.

FIG. 1B is a block diagram of an alternate RAID storage controller system that may also be conventional in the art. Unlike the system of FIG. 1A, the alternate system of FIG. 1B requires a less number of data transfers across the data communications bus 112 since data for a failed disk drive is reconstructed by the parity engine chip 108 prior to an initial storage in the memory buffer 104. Thus, in a typical scenario, a data stripe in the non-failed disk drives is read and transferred over the bus to the parity engine chip 108 which reconstructs the failed portion of the failed disk drive. The reconstructed stripe is transferred over the bus 112 to the memory buffer 104. The memory buffer 104 then transmits the reconstructed stripe over the bus for writing the stripe to the disk drives.

FIG. 1C is a timing diagram of the data reconstruction process that may be executed by the alternate RAID storage controller system of FIG. 1B. Each T0, T1, and T2 is assumed to be a period needed for a disk to complete a revolution. Each D0, D1, and D2 is assumed to be a disk drive in a three disk-drive array. In the illustrated example, it is assumed that D2 is the failed disk drive.

At T0, a read is performed in parallel on both non-failed disk drives D0 and D1 for reading a data stripe. At T1, the failed data is reconstructed and transmitted to the memory buffer under the control of the microprocessor. At T1, however, the disk drives have completed a revolution and are in position for performing another read or write. Nonetheless, the disk drive remain idle due to the delays in transmitting the reconstructed stripe to a memory buffer on a separate chip prior to being written to the disk drives. At T2, the microprocessor transmits the reconstructed stripe from the memory buffer to the drives for parallel writing of the data stripe.

In the storage controller system illustrated in FIG. 1A, the idle time for the non-failed disk drives is greater since the read data stripe is first stored in the memory buffer, then transmitted to the parity engine chip for reconstruction, and back to the memory buffer for storage, before the reconstructed data may be written or another data stripe to be reconstructed may be read. It is important, however, that the reading and writing of data stripes during reconstruction of a data drive be performed with minimal delays to avoid the risk of a failure of a second disk drive while a first failed disk drive is being reconstructed. Accordingly, what is desired is a storage controller system that minimizes the time needed for reconstructing a failed disk drive.

Another disadvantage with current media servers is that the housing of personal computers typically utilized as part of the media servers offer a limited amount of space for storage devices. Thus, the plurality of disk drives used in conjunction with a storage controller are often too large to fit within the housing of a personal computer. As a result, current media servers have separate housings for the plurality of storage devices, thus, imposing the requirement for extra floor space and external cabling for interconnection of the plurality of disk drives and storage controller with the other components of the media server. One disadvantage associated with current media servers is the common failure resulting from inadvertent cable disconnection.

Media servers also include data switches which route data from the plurality of storage devices and storage controller to interface processors which format the data for transmission to Internet users. Current data switches use high level protocols, agreed-upon formats for transmitting data between devices, such as Fibre Channel, Gigabit Ethernet, or ATM (asynchronous transfer mode). These high level protocols have the added disadvantage of requiring extensive, expensive electronics or very high speed processors which are difficult to use in very high bandwidth due to their complexity. Furthermore, the digital logic of current media server data switches is embodied in electronic circuitry having multiple electronic chips. As stated previously for storage controllers, having multiple electronic components results in slower speed and larger power consumption.

Another disadvantage associated with current media servers is the slow speed associated with the transmission of data from interface processors to Internet user's remote computer. In current media servers, the interface processor has to both generate packet headers for data transmitted from the media server and remove packet headers from data being stored on the media server. The constant flow of data back and forth across the interface processors internal data bus slows the data transfer speed and reduces the efficiency of the interface processor.

Current media servers also have the added disadvantage of not permitting removal of the electronic components, electronic circuit boards, and storage devices from the media server while the media server is electrically powered, commonly known as hot swappability. Permitting hot swappability of the electronic components, electronic circuit boards, and storage devices facilitates the removal and replacement of faulty components without interruption of media server service to Internet users.

Accordingly, it should be appreciated that there is a need for a cableless media server that encloses all of its components, including the plurality of storage devices, within one housing. Also, there is a need for a storage controller and a data switch which each implement their associated digital logic on a single electronic chip. Furthermore, there is the need for a media server having a data switch which implements a low level protocol. In addition, a need exists for a media server that offers increased data transmission speed from the data switch to the Internet user. Moreover, there is a need for a media server in which the electronic components, electronic circuit boards, and storage devices are hot swappable.

SUMMARY OF THE INVENTION

The present invention is directed to an improved data storage and retrieval system. According to one embodiment, the invention is directed to a data storage and retrieval system that includes a plurality of storage devices for storing data and a storage controller coupled to the plurality of storage devices. The storage controller includes an interface logic circuitry providing an interface with the plurality of storage devices for storing and retrieving the data, a reconstruction logic circuitry for reconstructing data associated with one of the plurality of storage devices, and a controller logic circuitry coupled to the interface logic circuitry and the reconstruction logic circuitry for controlling the storing, retrieving, and reconstruction of the data. According to this embodiment, the interface logic circuitry, the reconstruction logic circuitry, and the controller logic circuitry all reside within a single electronic chip.

In a further embodiment of the invention, the controller logic circuitry performs real-time, hardware based identification of an unresponsive storage device and signals the reconstruction logic circuitry for reconstructing data associated with the unresponsive storage device.

In another embodiment of the invention, the controller logic circuitry controls retrieval of a portion of data from the plurality of storage devices, causes reconstruction of an erroneous portion of the data, and further controls storing of the reconstructed data to the plurality of storage devices, wherein the reading and reconstructing occurs during time T and the writing occurs during time T+1, where T>0. In one embodiment, the time T is a time needed for a single revolution of one of the storage devices to complete.

In yet another embodiment of the invention, the data storage and retrieval system further includes a streaming engine including circuitry for automatically formatting in hardware data retrieved from the plurality of storage devices and transmitting the formatted data to a requesting user device.

In a further embodiment, the invention is directed to a method for controlling access to a plurality of storage devices where the method includes receiving a user request to retrieve data from the plurality of storage devices, identifying an unresponsive storage device, transmitting a signal for reconstructing data associated with the unresponsive storage device, and reconstructing the data associated with the unresponsive storage device. According to this embodiment, the identifying, transmitting, and reconstructing of the data associated with the unresponsive storage device occur in real-time via hardware mechanisms.

In a further embodiment, the invention is directed to a method for controlling access to a plurality of storage devices where the method includes receiving from the plurality of storage devices a first signal at a first logic gate and outputting a second signal, and further receiving from the plurality of storage devices the first signal at a second logic gate and outputting a third signal. The value of a counter is incremented or not based on the second signal and the third signal. The value is then transmitted to a comparator which compares the value against a threshold value. The reconstruction of data of a failed storage device occurs or not based on the comparison.

It should be appreciated, therefore, that the implementation of a single chip storage controller minimizes delays in reconstructing a non-responsive, failed storage device. Because the various components used in detecting and reconstructing the failed storage device reside within the single chip storage controller, no time and energy need to be expended in transmitting data and control information to separate processing chips, such as, for example, a separate reconstruction chip, and waiting for a response back from the separate processing chips before a reconstructed data word may be written to the reconstructed storage device. The single chip storage controller further allows the failover mechanism to be accomplished in hardware in real time. The delays encountered in utilizing separate processors chips for a software based failover mechanism may thus be avoided.

It should also be appreciated that the streaming engine of the present invention allows creation of header data automatically via hardware and improves data transmission speeds. The streaming engine need no longer rely on a separate computer processor for a software based generation of header data which causes delays in the data transmission.

BRIEF DESCRIPTION OF THE DRAWINGS

Other features and advantages of the present invention will become apparent from the following detailed description, taken in conjunction with the accompanying drawings, in which:

FIG. 2 is a block diagram of a single chip storage controller in accordance with an exemplary embodiment of the present invention;

FIG. 3 is a block diagram of a hardware method for real time failover of delayed storage devices in accordance with an exemplary embodiment of the present invention;

FIG. 4 is a block diagram of an AND gate logic unit utilized in the hardware method for real time failover of delayed storage devices of FIG. 3 in accordance with an exemplary embodiment of the present invention;

FIG. 5 is a block diagram of an OR gate logic unit utilized in the hardware method for real time failover of delayed storage devices of FIG. 3 in accordance with an exemplary embodiment of the present invention;

DETAILED DESCRIPTION

Figure 1A:
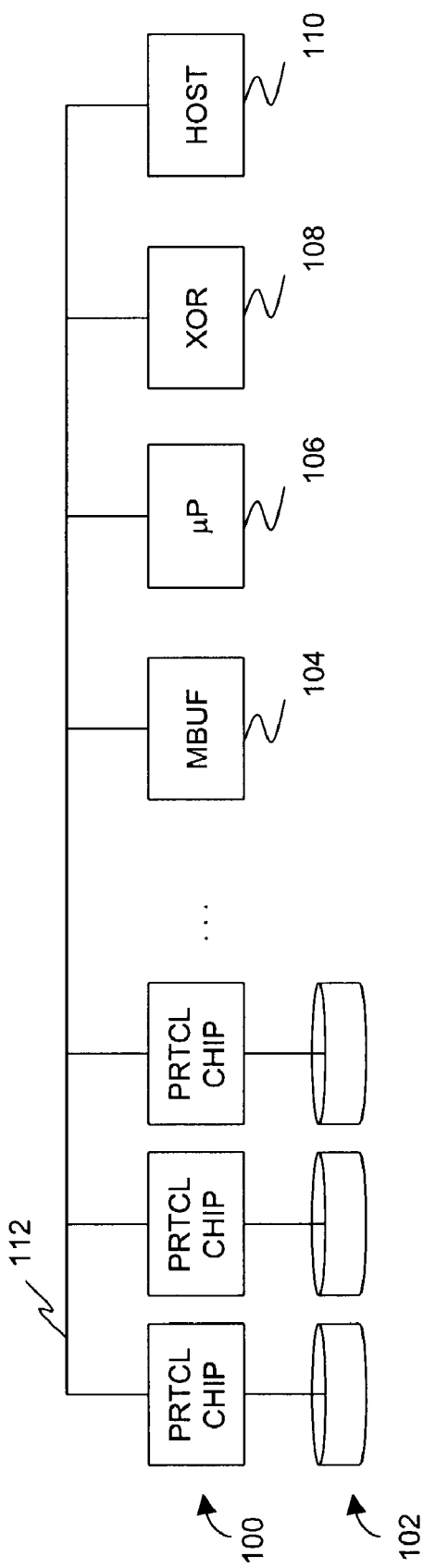
FIG. 1A is a schematic block diagram of a conventional RAID storage controller system that provides data reconstruction functionality.
Figure 1B:
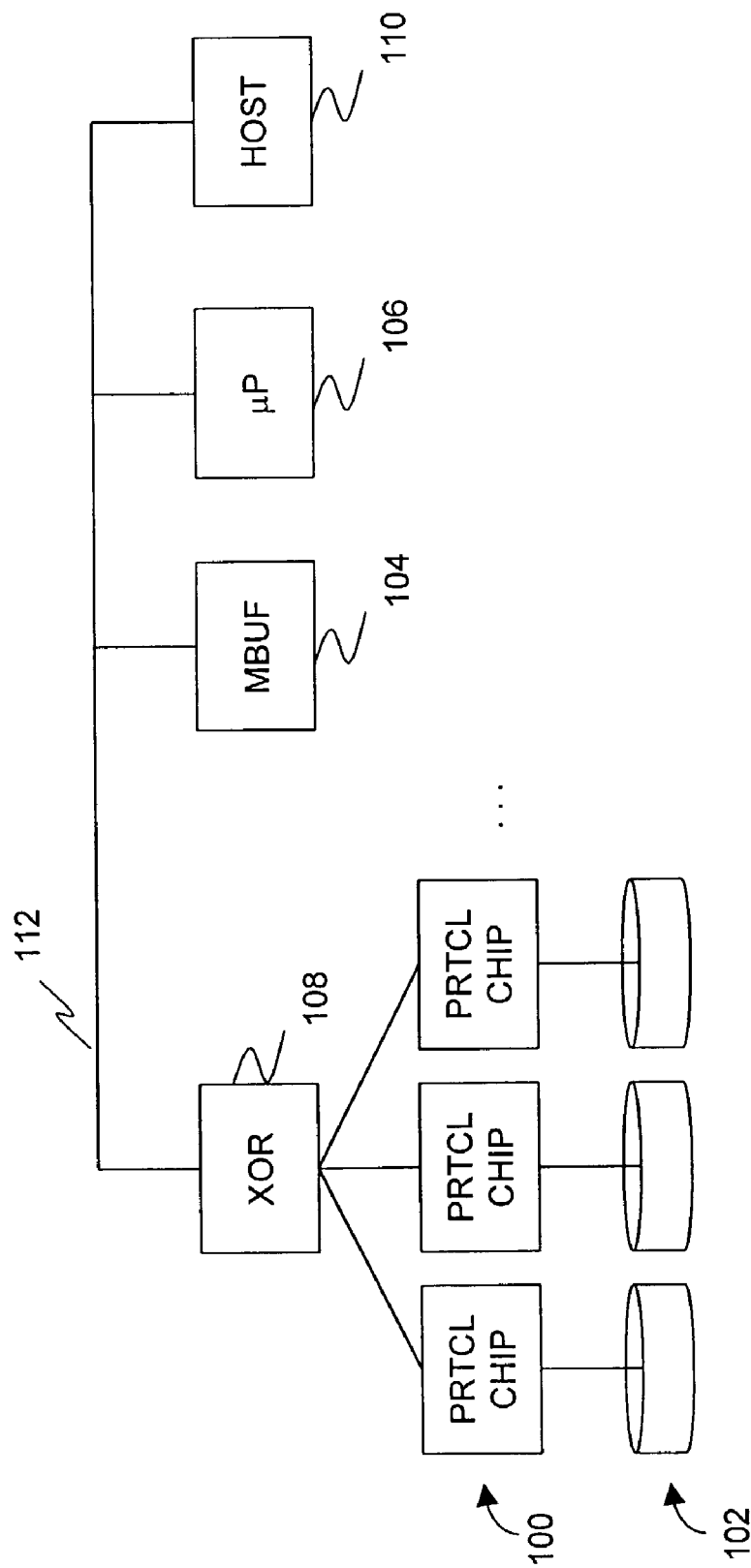
FIG. 1B is a block diagram of an alternate RAID storage controller system that may also be conventional in the art.
Figure 1C:
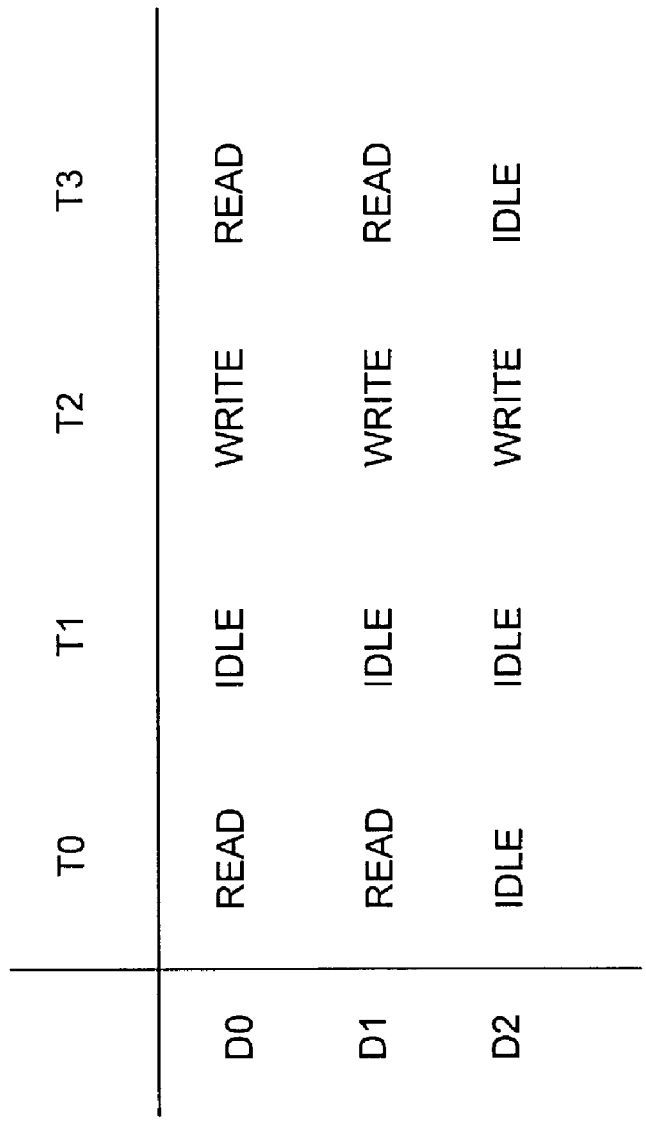
FIG. 1C is a timing diagram of the data reconstruction process that may be executed by the alternate RAID storage controller system of FIG. 1B.
Figure 1D:
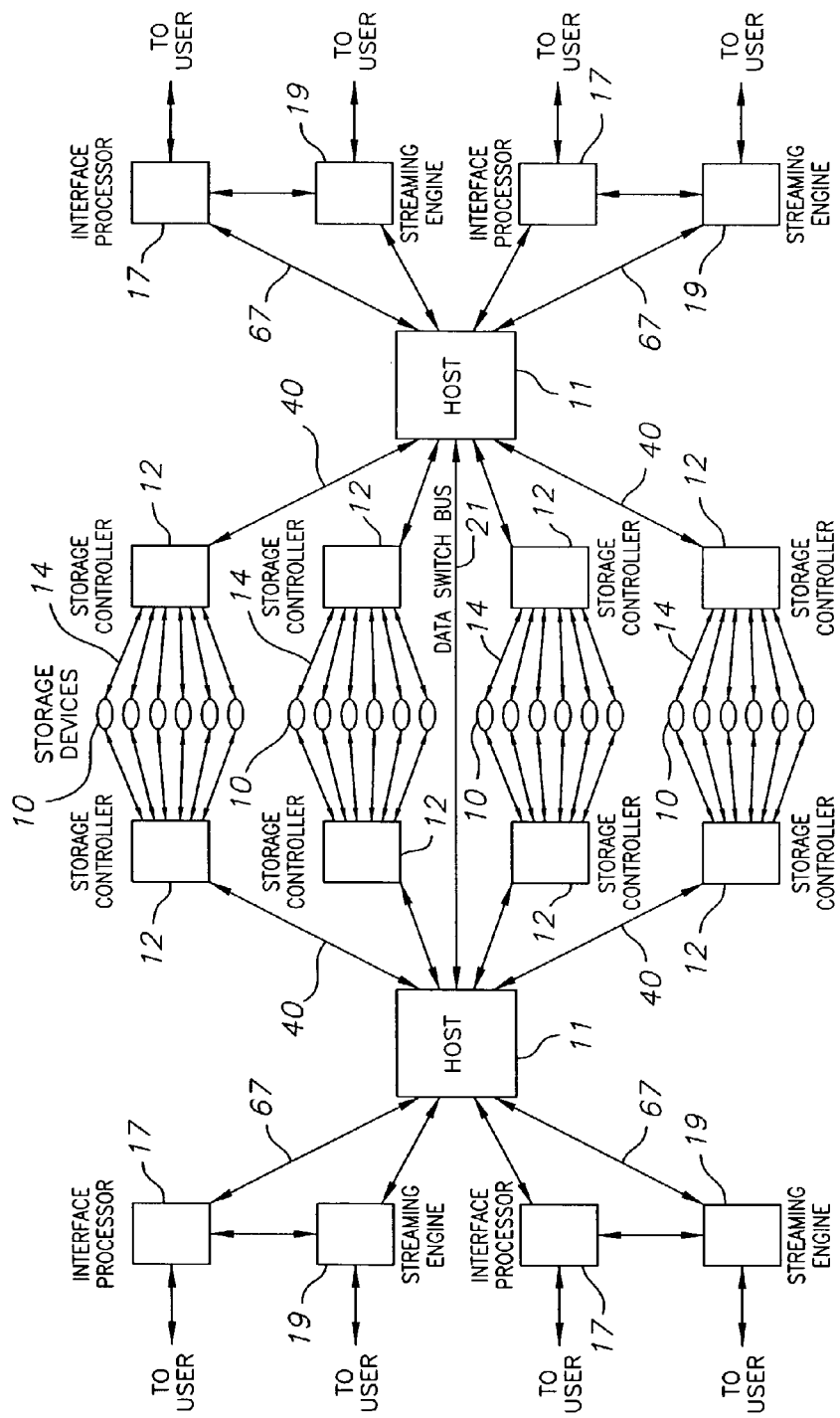
FIG. 1D is a block diagram of a media server in accordance with an exemplary embodiment of the present invention.

With reference to FIG. 1D, an architecture of a media server in accordance with an embodiment of the invention is illustrated in block form. The media server includes a plurality of storage devices 10, storage controllers 12, host interfaces 11, interface processors 17, and streaming engines 19. According to one embodiment of the invention, the storage devices 10 are hot-swappable disk drives supporting an Ultra DMA (UDMA) data transmission protocol conventional in the data storage industry. Each UDMA disk drive may be approximately three and a half inches in height, approximately five inches in width, and approximately seven inches in length. Current UDMA disk drives store upwards of 75 gigabytes of information.

According to one embodiment, each grouping of, for example, six storage devices, constitutes a RAID array that are controlled by a storage controller 12. The storage controller is an electronic system including digital logic for controlling the transfer of data and information to and from each of the storage devices. Each storage device electrically interfaces with the storage controller via a bidirectional 16-bit data bus 14. According to one embodiment, the storage controller is implemented in a single semiconductor chip where the single chip storage controller 12 performs the functions of a RAID controller. Each single chip storage controller 12 may be mounted on a hot swappable printed circuit board referred to as a controller circuit board. According to one embodiment, the controller circuit board is approximately five and a half inches by approximately four inches.

The single chip storage controllers 12 are electrically coupled to one or more host interfaces 11 via a bidirectional 16-bit data bus 40. The host interfaces 11 include digital logic for controlling the flow of data between the storage controllers 12 and the interface processors 17 or streaming engines 19. The host interfaces 11 may also be electrically coupled with each another via a 16-bit switch data bus referred to as a data switch bus 21.

According to one embodiment of the invention, the host interface is a hot-swappable, single chip data switch implementing the UDMA protocol. The single chip data switch may be embodied in an FPGA, field programable gate array, model EPF10K400484-3 manufactured by Altera located in San Jose, Calif. Alternatively, the single chip data switch may be embodied in an application specific integrated circuit (ASIC). The single chip data switch may be used for various other protocols besides the UDMA protocol, such as, for example, the Advanced Technology Attachment (ATA) protocol and other storage device protocols conventional in the art.

The interface processors 17 may be an electronic system that electrically interfaces with a user's remote computer and processes requests from the user to store data to and transfer data from the storage devices 10. Each interface processor is coupled to a streaming engine 19 including digital logic for streaming data stored in the storage devices 10 to the user's remote computer. According to one embodiment of the invention, the streaming engine allows for high speed data transfer by automating the generating and removing of packet headers in hardware instead of software.

According to one embodiment of the present invention, two of the interface processors 17, two of the streaming engines 19, and one host interface 11 are configured onto a single hot swappable printed circuit board referred to as an interface circuit board. The interface circuit board may be approximately 12 inches by approximately 5 inches. Thus, all of the electrical interfaces represented by arrows between one host interface and its corresponding pair of interface processors and pair of streaming engines are physically configured into the interface circuit board.

A preferred embodiment of the present invention includes a single housing that is approximately nineteen inches in width, approximately forty inches in length, and approximately seven inches in height. The single housing encloses a printed circuit called a backplane which is approximately nineteen inches by approximately forty inches. According to one embodiment, the single housing also encloses two interface circuit boards, eight storage controller 12 circuit boards and twenty-four storage devices 10. The two interface circuit boards, eight storage controller 12 circuit boards, and the twenty-four storage devices 10 are physically connected to the backplane via interface connectors such that the two interface boards, eight storage controller circuit boards, and twenty-four storage devices extend perpendicularly from the surface of the backplane. No cables are required for interconnection of the printed circuit boards that comprise the media server. Thus, the electrical interfaces represented by arrows in FIG. 1 between the storage devices and the storage controllers, and between the storage controllers and the host interfaces are routed through the backplane.

Thus, according to one embodiment, the single housing encloses all of the components of the media server, preventing the need for external cabling between housings. External cabling is disadvantageous since it may be easily disconnected or damaged. Moreover, all of the electronic circuit boards making up the media server directly interface with one another via connectors instead of cables. The lack of cabling helps improve reliability of the media server and reduces cost since cables need not be purchased or fabricated.

Embodiments of the present invention also benefit from having all of their components configured on hot swappable electronic components, electronic printed circuit boards, and storage devices. Hot swappable electronic components, electronic printed circuit boards, and storage devices allow the media server to maintain service to Internet users even though electronic components, electronic printed circuit boards, and/or storage devices are removed from the media server and replaced due to defect or routine maintenance. Thus, the hot swappable electronic components, electronic printed circuit boards, and storage devices in the present invention advantageously allow for maximum availability of the media server to Internet users.

An additional advantage associated with embodiments of the present invention is that the hardware components, the interface processors, streaming engines, host interfaces, and storage controllers are all configured with dual access paths. For example, according to one embodiment of the present invention, the media server includes four pluralities of storage devices 10, eight storage controllers 12, two host interfaces 11, four interface processors 17, and four streaming engines 19. Two storage controllers are electrically connected to one plurality of storage devices. Each host interface is electrically connected to four storage controllers where each storage controller is electrically connected to a different plurality of storage devices. Two pairs of interface processors and streaming engines are electrically connected to each host interface. Thus, because of this hardware configuration, the media server can continue to transfer data between the plurality of storage devices and a remote computer even though there is an electrical disconnection of one storage controller, one host interface, one interface processor, or one streaming engine.

In general terms, a user transmits to the media server requests to retrieve or store data from and to the storage devices 10. Data to be stored is transmitted by the user's remote computer and received by the interface processor 17 for transmitting to the host interface 11. The host interface 11 selects one or more storage controllers 12 to receive the data, and forwards the data to the selected storage controllers. The storage controllers then cause the data to be stored in the associated storage devices in striped arrangement. The storage controllers also store check data for reconstructing a particular portion of the stripe in the event of a disk failure.

If the user transmits a request to retrieve data, the storage controller retrieves the desired data, performs any reconstruction of the data due to a failed storage device, and transmits it to the host interface 11. The host interface transmits it to the interface processor 17 which invokes the streaming engine 19 to transfer the data to the user at a high data rate.

FIG. 2 is a more detailed schematic block diagram of the single chip storage controller according to one embodiment of the present invention. The storage controller 12 includes storage device interface logic units 20, a parity generation and reconstruction logic unit 22, a high speed data path 24, a controller logic unit 26, and a control path 25, all in a single semiconductor chip. Each storage device interface logic unit 20 is electrically interfaced, via the bidirectional 16-bit data bus 14, with one of the storage devices 10. The storage device interface logic unit preferably includes circuitry implementing the protocol of the storage device, such as, for example, the UDMA protocol. Each device interface logic unit 20 also interfaces electrically with the controller logic unit 26 via a bidirectional 16-bit data bus 30.

The parity generation and reconstruction logic unit 22 includes circuitry for implementing the storage controller's parity scheme and for reconstructing missing data from a disabled storage device. The parity and reconstruction logic unit electrically interfaces with each of the storage device interface logic units 20 via a bidirectional 16-bit data bus 28. The parity and reconstruction logic unit also electrically interfaces with the controller logic unit via a bidirectional 16-bit data bus 32.

The high speed data path 24 allows for the transmission of data at high rates such as, for example, 50 MHz. The high speed data path electrically interfaces with the parity generation and reconstruction logic unit 22 via a bidirectional 16-bit data bus 34. The high speed data path also electrically interfaces with the controller logic unit 24 via a separate 16-bit data bus 36. Additionally, the high speed data path electrically interfaces with the host interface 11 via a bidirectional 16-bit data bus 40.

The controller logic unit 26 includes storage registers that contain data used to control the storage device interface logic units 20, the parity generation and reconstruction logic unit 22, the high speed data path 24, and the control path 25. According to one embodiment, the controller logic unit 26 includes circuitry that allows for a hardware based mechanism for real time failover of a delayed storage device that delays data transfer for longer than a preset time period. In general terms, failover is a mode of operation for failure tolerant systems in which a component has failed and a redundant component has assumed its function.

FIG. 3 is a more detailed schematic block diagram of the controller logic unit 26 used for implementing the hardware based mechanism for real time failover according to one embodiment of the invention. The controller logic unit includes an AND gate logic unit 42, an OR gate logic unit 44, a binary counter 46, a system clock 48, a comparator logic unit 50, and an ignore delayed storage device logic unit 52. The AND gate logic unit 42 is used to determine whether or not all of the storage devices are ready to transfer data. The OR gate logic unit 44 is used to determine whether or not all of the storage devices except for one are ready to transfer data.

The binary counter 46 includes a clear input 46a which is set by the AND gate logic unit 42, an increment input 46b which is set by the OR gate logic unit 44, and a value output 46c. The value output 46c is electrically connected to the input of the comparator logic unit 50. The system clock 48 is electrically connected to the binary counter 46. The output from the comparator logic unit is electrically connected to the ignore delayed storage device logic unit 52. The output of the ignore delayed storage device logic unit is electrically connected to the parity generation and reconstruction logic unit 22.

FIG. 4 is a more detailed schematic block diagram of the AND gate logic unit 42 according to one embodiment of the invention. The AND gate logic unit 42 includes an AND gate 42a with inputs 42b that are electrically connected to the storage device interface logic units 20. The output 42c of the AND gate is electrically connected to the clear input 46a of the binary counter 46.

FIG. 5 is a more detailed schematic block diagram of the OR gate logic unit 44 according to one embodiment of the invention. The OR gate logic unit 44 includes a plurality of AND gates 44a, a plurality of invertors 44b, and an OR gate 44c. According to one embodiment of the invention, each of the six device interface logic units is directly electrically connected to an input of five of the AND gates, and electrically connected via an invertor 44b to the remaining AND gate. The output of each AND gate 44a is electrically connected to one of the OR gate 44c inputs. The output of the OR gate 44c electrically connects to the increment input 46b of the binary counter.

In order to effectuate storage of data transmitted by a user, the single chip storage controller 12 of FIG. 2 receives a write control information from the host interface 11 via the control path 25, and the actual data to be stored via the high speed data path 24. The high speed data path 24 transfers the data to be stored to the parity generation and reconstruction logic unit 22. The control path 25 transfer the write control information to the controller logic unit 26.

The parity generation and reconstruction logic unit calculates the check bytes for the data and transfers the data along with the check bytes to the storage device interface logic units 20. The controller logic unit 26 also transfers the write control information to each device interface logic unit 20 which in turn transfers the write control information, data, and check bytes, to the storage devices where the data and check bytes are stored. According to one embodiment of the invention, the data is stored in a stripped arrangement where the first 16-bit word of data is stored on the first storage device, the second 16-bit word of data is stored on the second storage device, the third 16-bit word of data is stored on the third storage device, the fourth 16-bit word of data is stored on the fourth storage device, the fifth 16-bit word of data is stored on the fifth storage device, and a sixth 16-bit word of parity information (check bytes) is stored on the sixth storage device. According to one embodiment, each bit of the sixth 16-bit word of parity information is the sum without carry of the corresponding bit from the first, second, third, fourth, and fifth words of data.

In order to effectuate retrieval of data via the single chip storage controller 12, the control path 25 of the single chip storage controller receives read control information from the host interface 11 indicative of the location of the desired data. The read control information is passed to the controller logic unit 26 which transmits the information to the storage controller logic units 20 for enabling their corresponding storage devices 10. Each storage device 10 reads the data that has been requested, generates transfer control information, and transfers the retrieved data along with transfer control information back to the storage controller 12.

The storage device interface logic units 20 in the storage controller 12 receive the retrieved data and transfer control information from each respective storage device 10 and forward the retrieved data to the parity generation and reconstruction logic unit 22. The transfer control information is forwarded to the controller logic unit 26. The controller logic unit 26 determines whether any of the storage devices is non-response to the request to transfer data. If a non-responsive storage device is identified, the unit invokes the parity generation and reconstruction logic unit 22 for reconstructing the missing data.

According to one embodiment of the invention, the controller logic unit 26 determines when one of the storage devices is non-responsive via a hardware method of real time failover. The implementation of the controller logic unit 26 and parity generation and reconstruction logic unit 22 in a single chip allows the failover mechanism to be accomplished in hardware in real time. The delays encountered in utilizing separate processors chips for a software based failover mechanism may thus be avoided.

The hardware method of real time failover may generally be implemented as follows. Each storage device 10 generates a logic level high ready signal when the storage device is enabled and ready to transfer data. The ready signal is logic level low when the storage device is either not enabled or not ready to transfer data. This ready signal is transferred to its corresponding storage device interface logic unit 20 which transfers the ready signal to both the AND gate logic unit 42 and the OR gate logic unit 44 located within the controller logic unit 26.

The AND gate 42a in the AND gate logic unit 42 receives the ready signals from each of the six storage devices 10 and outputs a logic level high when all six storage devices are enabled and ready to transfer data. In contrast, the output of the AND gate is logic level low if any of the six storage devices are not enabled and ready to transfer data. The signal output from the AND gate logic unit is fed into the binary counter as the counter's clear input. Thus, when all six of the storage devices are ready to transfer data, the binary counter's clear input 46a is maintained logic level high, and the binary counter does not increment with the clock signal generated by the system clock 48.

If the ready signal from any of the six storage devices is logic level low, the AND gate's output signal 46a is logic level low, and the binary counter's clear input is held logic level low. When the binary counter's clear input signal 46a is held logic level low, it allows the binary counter 46 to increment depending upon the value of the increment input 46b to the binary counter and the signal from the system clock 48.

The OR gate logic unit 44 also receives the ready signals from each of the six storage devices 10. Each ready signal is transferred from one of the storage devices through a storage device interface logic unit 20 to one of the inputs of each of five AND gates 44a in the OR gate logic unit 44. The ready signal for each storage device is also sent through an inverter prior to being input to a sixth AND gate. If all of the storage devices 10 are enabled and ready to transfer data, the ready signal generated by each of the storage devices is logic level high. Because of the inverter 44b, however, the output signals from all of the AND gates 44a is logic level low, and the output of the OR gate 44c logic unit is logic level low. Thus, the increment input 46b to the binary counter is logic level low which prevents the binary counter 46 from incrementing.

As a result of the OR gate logic unit's configuration, the output from one of the AND gates 44a is a logic level high if one of the storage devices' ready signal is logic level low. When one of the AND gates 44a has an output signal which is logic level high, it causes the OR gate's output to also be logic level high. This logic level high output signal from the OR gate logic unit 44 is fed into the binary counter's increment input 46b which causes the binary counter to increment with each clock signal received from the system clock 48.

The output value 46c of the binary counter 46 is fed into the comparator logic unit 50 which compares the value of the binary counter to a preset threshold value held in a memory register in the comparator logic unit. According to one embodiment, the threshold value is adjustable since the threshold value is held in memory and is not fixed by hardware components. Typically, the threshold value is set to a number which corresponds to a time period of approximately 200 milliseconds. If the value of the binary counter 46 is greater than the stored threshold value, the comparator logic unit's output signal which is sent to the ignore delayed storage device logic unit 52 is logic level high. The logic level high signal from the comparator logic unit 50 in turn enables reconstruction of the missing word by the parity generation and reconstruction logic unit 22 and sets a bit in the controller logic unit indicating the specific storage device that is non-responsive. The controller logic unit 26 transfers transfer control information to the parity generation and reconstruction logic unit 22 and further transfers a data signal to the storage device interface logic unit 20 which corresponds to the non-responsive storage device requesting the that the non-responsive storage device be disabled.

A missing word of data stored on the non-responsive and disabled storage device is reconstructed in the parity generation and reconstruction logic unit 22 according to conventional mechanisms. In general terms, the missing word is reconstructed by utilizing the check bytes and the data words retrieved from the non-failing storage devices 10.

In contrast, if the value of the binary counter 46 is less than the stored threshold value, the comparator logic unit's output signal to the ignore delayed storage device logic unit 52 is logic level low which disables reconstruction by the parity generation and reconstruction logic unit 22.

The single chip storage controller 12 further minimizes delays in reconstructing a non-responsive, failed storage device 10 once the failed device is replaced. According to one embodiment, the reconstruction is performed on a stripe-by-stripe basis from the data words and check bytes stored in the non-failed storage devices. The data words and check bytes retrieved from the non-failing storage devices 10 are processed by the parity generation and reconstruction logic unit within the single chip, avoiding the need to expend time in transmitting the retrieved data to separate processing chips, such as, for example, a separate reconstruction chip, and waiting for a response from the separate processing chips before a reconstructed data word may be written to back to the reconstructed storage device.

Figure 11:
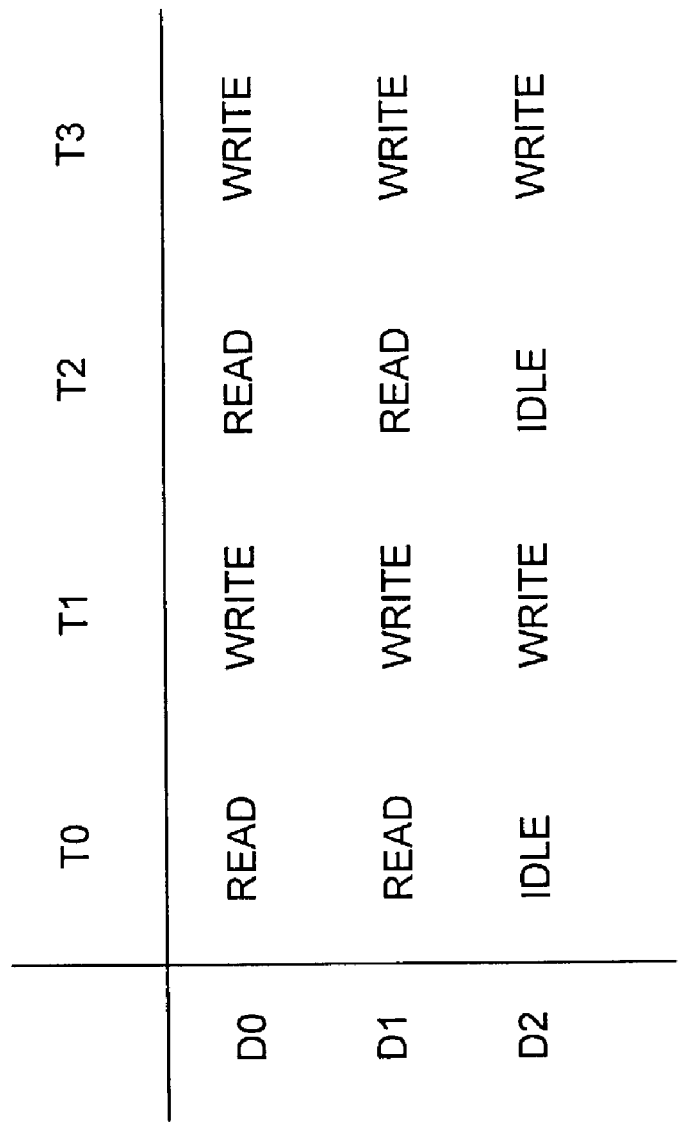
FIG. 11 is a timing diagram of an exemplary data reconstruction process executed by the single chip storage controller of FIG. 2 according to one embodiment of the invention.

FIG. 11 is a timing diagram of an exemplary data reconstruction process executed by the single chip storage controller 12 according to one embodiment of the invention. Each T0, T1, and T2 is assumed to be an amount of time sufficient for performing a read or write of a storage device 10. According to one embodiment, each T0, T1, and T2 is assumed to be a time for a revolution of a disk drive to complete. Each D0, D1, and D2 is assumed to be a storage device in a three disk-drive array. In the illustrated example, it is assumed that D2 is the failed disk drive that is reconstructed.

At time T0, the controller logic unit 26 signals the storage device interface logic units 20 of the non-failed storage devices, D0 and D1, to perform a parallel read of a first data stripe used for reconstructing a first data word of storage device D2. According to one embodiment of the invention, the parity generation and reconstruction logic unit 22 completes reconstruction of the first data stripe with the reconstructed first data word by the time T1, the time in which the storage devices have completed a revolution and are in position for performing a next disk access. According to one embodiment, T1= T0+1. The controller logic unit 26 signals the storage device interface logic units 20 to write the reconstructed stripe in the storage devices, including the reconstructed word in storage device D2, at time T1. The storage devices thus proceed to write the reconstructed stripe at time T1.

The reconstruction process continues at times T2 and T3 where a next data stripe is read and reconstructed during a period of a single revolution (T2) and the reconstructed stripe is re-written to the storage devices during a period of a subsequent revolution (T3). According to this embodiment, data is either read or written at each revolution of the storage devices, allowing a speedier reconstruction of a failed disk drive.

Figure 6:
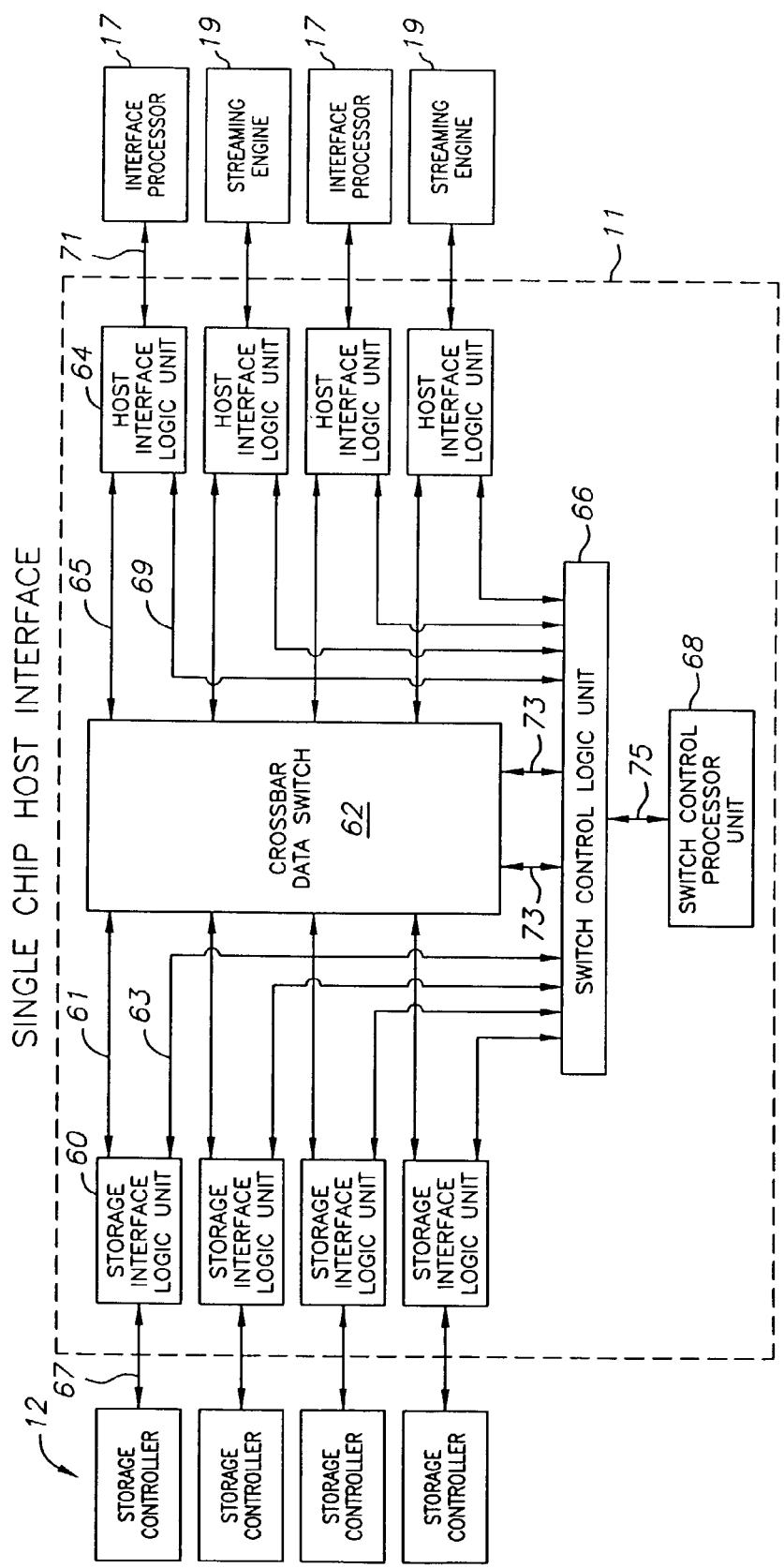
FIG. 6 is a block diagram of a single chip host interface in accordance with an exemplary embodiment of the present invention.

FIG. 6 is a schematic block diagram of the host interface of FIG. 1D according to one embodiment of the invention. The host interface is configured to relay data between the storage devices and the users. The host interface may also be referred to as a data switch.

According to one embodiment of the invention, the host interface includes a plurality of storage interface logic units 60, a crossbar data switch 62, a plurality of host interface logic units 64, a switch control logic unit 66, and a switch control processor unit 68, all located within a single semiconductor chip. Similar to the advantages associated with the single chip storage controller, the single chip host interface 11 has the advantage of decreased power consumption, heat generation, and occupation of printed circuit board space, decreased purchase and manufacturing costs associated with the purchase and installation of multiple electronic components, and increased performance speed.

The single chip host interface 11 included in embodiments of the present invention is also advantageous in that it implements a low level protocol, such as, for example, the UDMA protocol, eliminating the need for extensive and expensive electronics or high speed processors used for high level protocols such as Fibre Channel, Gigabit Ethernet, or ATM.

Each storage interface logic unit 60 in the host interface 11 electrically interfaces to one of the storage controllers 12 via a bidirectional 16-bit data bus 67. In alternative embodiments, the each storage interface logic unit 60 electrically interfaces with one of the storage devices 10 directly instead of the storage controller. Each storage interface logic unit 60 also electrically interfaces with the crossbar data switch 62 and the switch control logic unit 66 via separate bidirectional 16-bit data buses 61, 63. Similarly, each host interface logic unit 64 electrically interfaces with both the crossbar data switch and the switch control logic unit through separate bidirectional 16-bit data buses 65, 69. Each host interface logic unit 64 electrically interfaces with the interface processors 17 or the streaming engines 19 via a bidirectional 16-bit data bus 71. The crossbar data switch 62 includes two unidirectional data switches, each of which is electrically connected to the switch control logic unit 66 via a bidirectional 16-bit data bus 73. A person skilled in the art should recognize that instead of a crossbar switch, other switch architectures may be employed such as a cell switch or a shared packet memory switch.

The switch control logic unit 66 is connected to the switch control processor unit 68 via a bidirectional 16-bit data bus 75. According to one embodiment, the switch control processor unit includes one or more memories and a microprocessor which controls data retrieval and forwarding operations as directed by an operating program stored in the memory.

In general terms, the single chip host interface 11 receives data to be stored in the storage devices from the interface processors 17 via the host interface logic unit 64. The host interface logic unit 64 also receives write control information from the interface processor 17. According to one embodiment of the invention, the write control information adheres to a low level protocol, such as, for example, the UDMA protocol.

The write control information is transferred to the switch control logic unit 66 and the data to be stored is transferred to a unidirectional switch in the crossbar data switch 62. The unidirectional switch is set by control data bits sent from the switch control logic unit 66 which is controlled by the switch control processor unit 68 to the crossbar data switch 62. Setting the unidirectional switch in the crossbar data switch selects which of the storage interface logic units 60, and thus, which storage controller 12 will receive the data and write control information. The selected storage interface logic unit 60 then receives the data from the crossbar data switch 62 and write control information from the switch control logic unit 66. The storage interface logic unit 60 converts the data and write control information into a 16-bit word according to a low level protocol, such as, for example, the UDMA protocol. The data and write control information is then transferred to a storage controller 12 which stores the data on its corresponding group of storage devices 10. Data which has already been stored on the storage devices 10 may also be retrieved and provided to a user's remote computer. In this regard, the single chip host interface 11 receives read control information from the interface processor 17 by one of the host interface logic units 64 which transfers the read control information to the switch control logic unit 66. According to one embodiment of the invention, the read control information adheres to a low level protocol, such as, for example, the UDMA protocol.

The switch control logic unit 66, under the control of the switch control processor unit 68, transfers control data bits to the crossbar data switch 62 which sets one of the unidirectional switches in the crossbar data switch so as to route data from the crossbar data switch to one or more selected host interface logic units 64. The switch control logic unit 66 also transfers control data bits-to the crossbar data switch 62 which sets the other unidirectional switch so as to route data from a selected storage controller 12 via a storage interface logic unit 60 to the crossbar data switch. The switch control logic unit 66 transfers the read control information to the storage interface logic unit 60 through which data will travel. The storage interface logic unit 60 then transfers the read control information to its associated storage controller 12, causing retrieval of the desired data from the storage devices 10.

The retrieved data and associated transfer control information is received from the storage controller 12 by a storage interface logic unit 60. The storage interface logic unit 60 transfers the data to the unidirectional switch in the crossbar data switch 62 and the transfer control information to the switch control logic unit 66. The switch control logic unit 66 under the control of the switch control processor unit 68 transfers the transfer control information to the crossbar data switch 62 and host interface logic units 64. The crossbar data switch 62 transfers the data from the unidirectional switch to one or more host interface logic units 64.

According to one embodiment, the switch control processor unit 68 operates via a processor which utilizes data stored in a read/ write memory for the processor and a flash memory, the non-volatile memory which holds the program executed by the processor. Transfer control information from the switch control logic unit 68 enables drivers in the selected host interface logic unit 64 so that data and transfer control information are transferred to the interface processor 17, in embodiments having no streaming engine 19, or transferred to the streaming engine or interface processor, respectively, in embodiments implementing both a streaming engine and interface processor.

Figure 7:
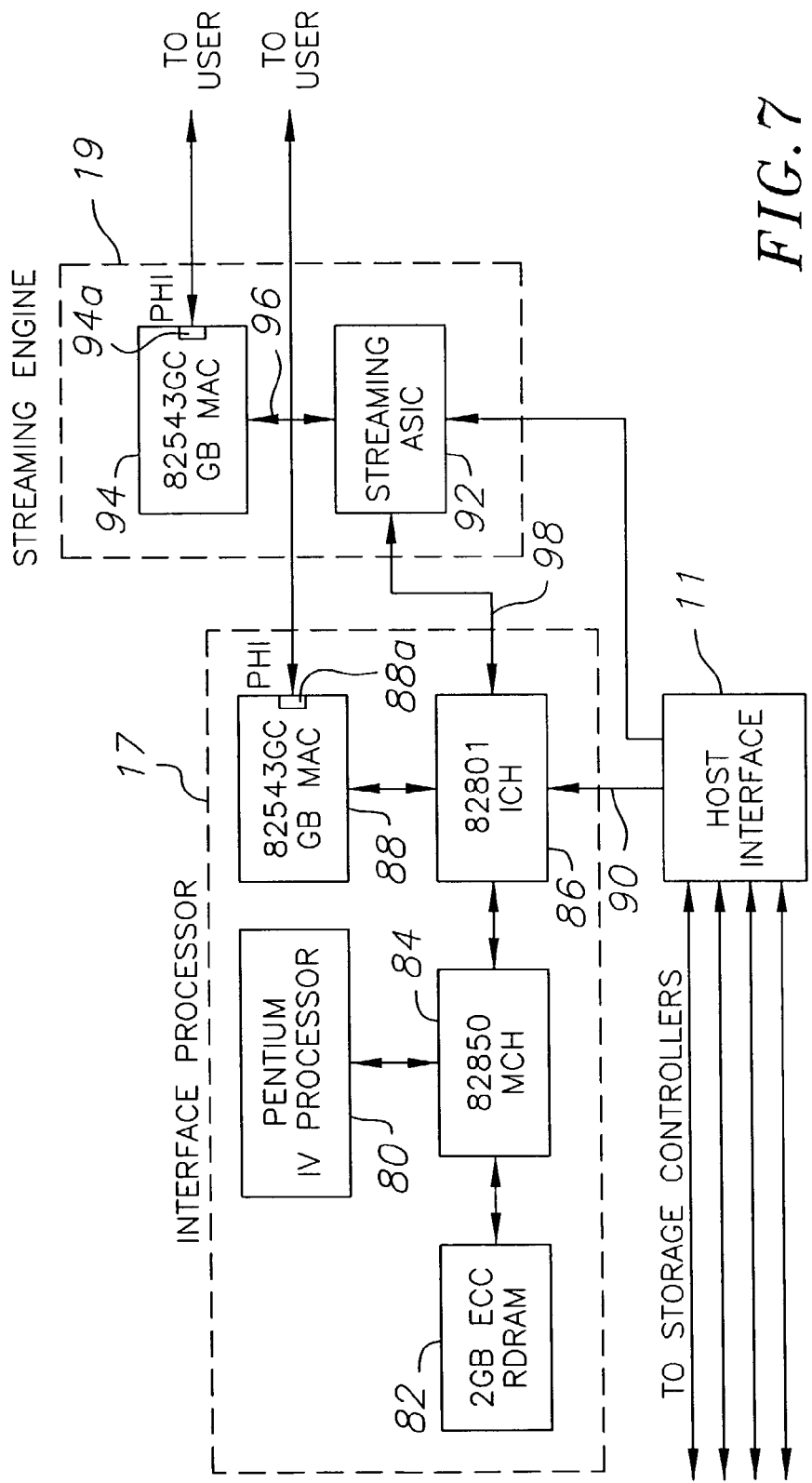
FIG. 7 is a block diagram of an interface processor and streaming engine in accordance with an exemplary embodiment of the present invention.

FIG. 7 is a schematic block diagram of the interface processor 17 and streaming engine 19 according to one embodiment of the invention. The interface processor 17 includes a processor 80, such as, for example, a Pentium IV processor, and a memory 82 that includes special circuitry for testing data accuracy, such as, for example, a two gigabyte error-correcting code RAMBUS dynamic random access memory (2 GB ECC RDRAM). The interface processor 17 further includes a memory controller hub (MCH) which controls the flow of data along an internal PCI bus, such as, for example, a 82850 MCH. An input/output controller hub (ICH) 86 such as, for example, an 82801 ICH, electrically interfaces with to the host interface 11 via a bidirectional 16-bit bus 90 and controls the input and output of data to and from the interface processor 17. The interface processor 17 also includes a media access controller (MAC) 88 such as, for example, a 82543 GC GB MAC, which includes a device called a PHI 88a. The PHI is the physical interface between the 82543GC GB MAC and the cable that embodies the Ethernet line that electrically connects the interface processor to the Internet user's remote computer.

The streaming engine 70 includes a streaming application specific integrated circuit (ASIC) 92 and a MAC 94 such as, for example, an 82543GC GB MAC. According to one embodiment, the streaming ASIC 92 and MAC 94 are separate electronic chips that are electrically connected to one another via a bidirectional 16-bit bus 96. The streaming ASIC 92 electrically interfaces with the ICH 86 of the interface processor 17 and the host interface 11 via separate bidirectional 16-bit buses 98. The streaming engine's MAC 94 electrically interfaces with the user's remote computer via the controller's PHI 94a.

Figure 8:
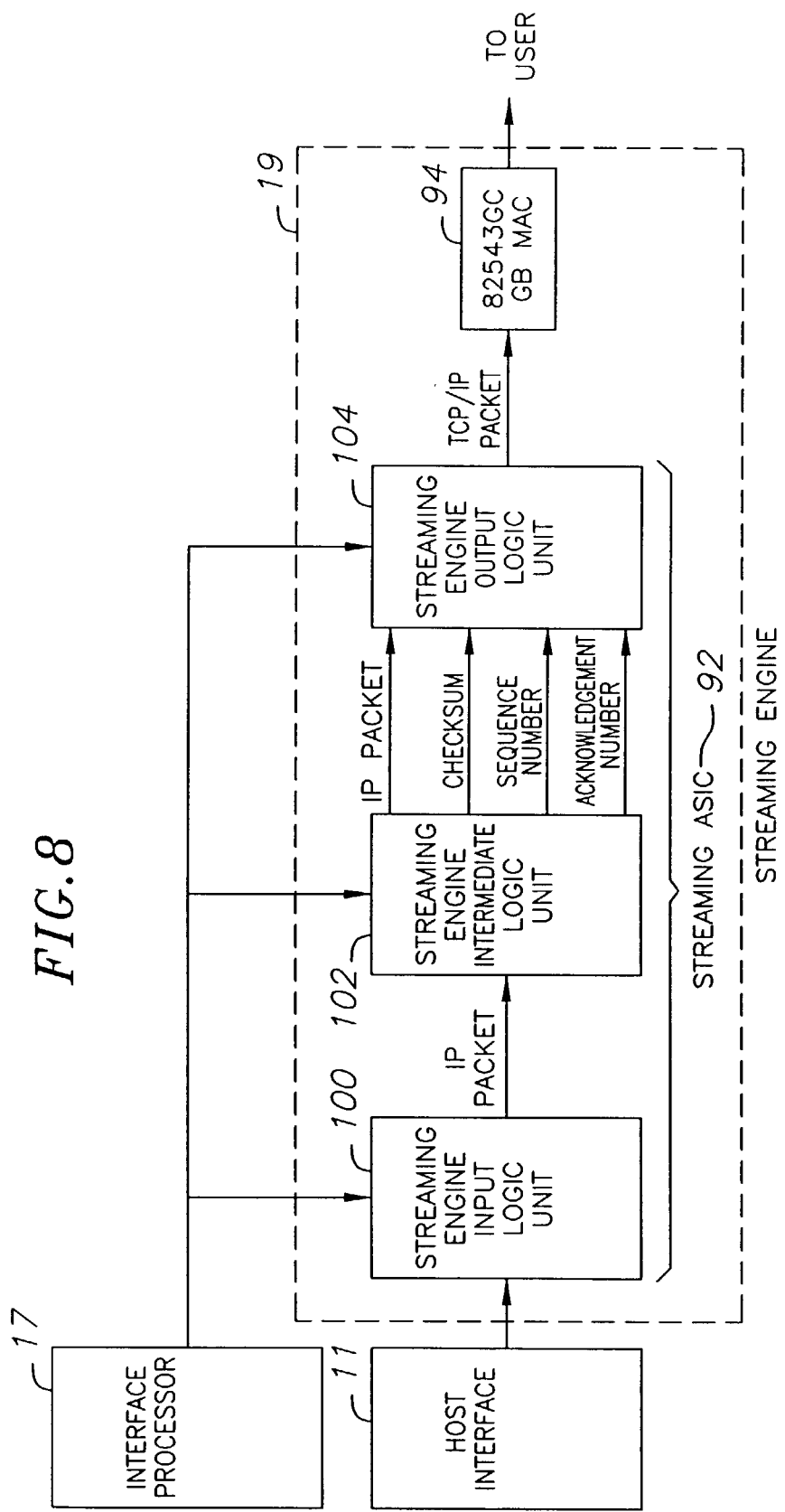
FIG. 8 is a block diagram of the streaming engine of FIG. 7 in accordance with an exemplary embodiment of the present invention.
Figure 9:
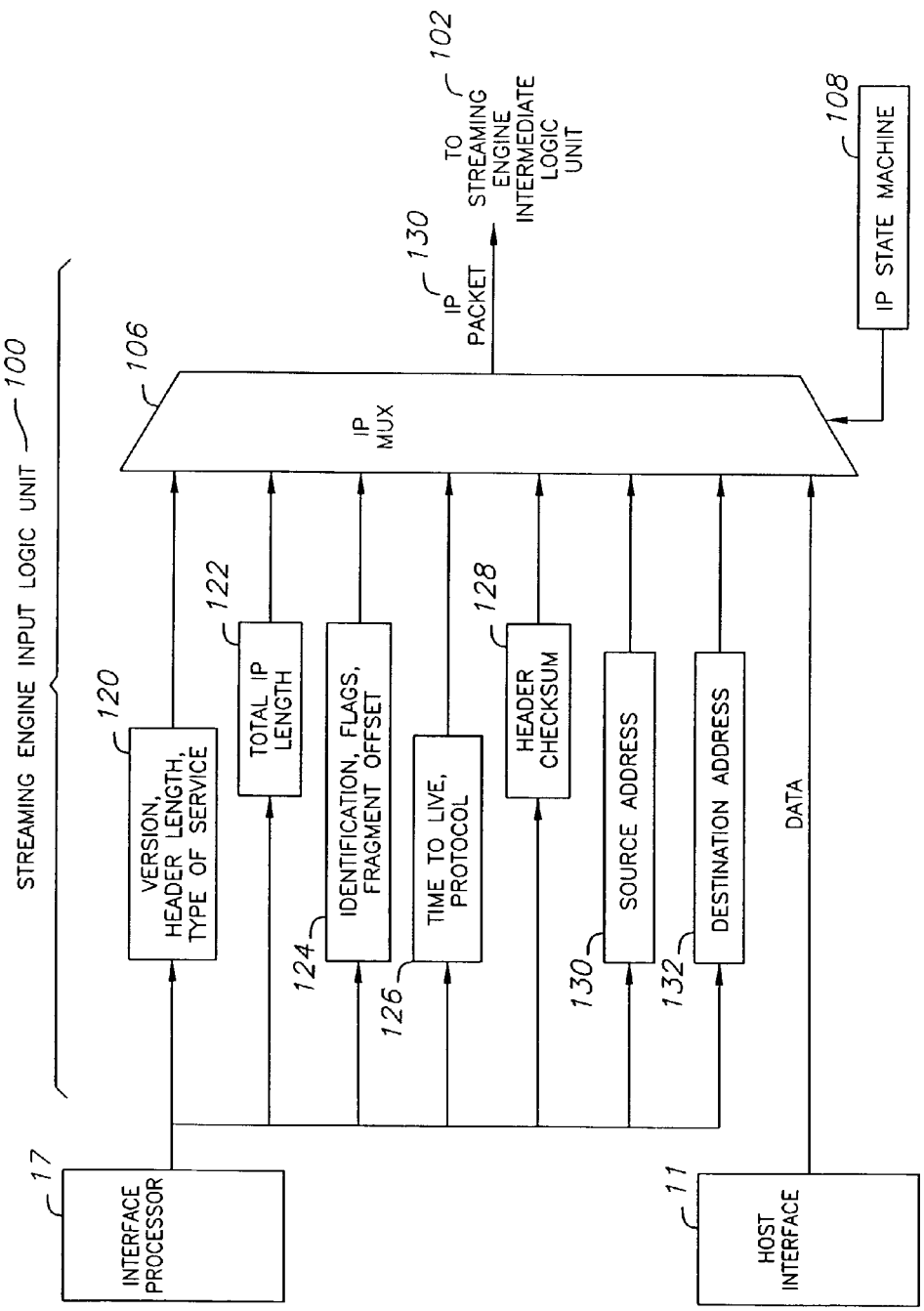
FIG. 9 is a block diagram of a streaming engine input logic in accordance with an exemplary embodiment of the present invention.
Figure 10:
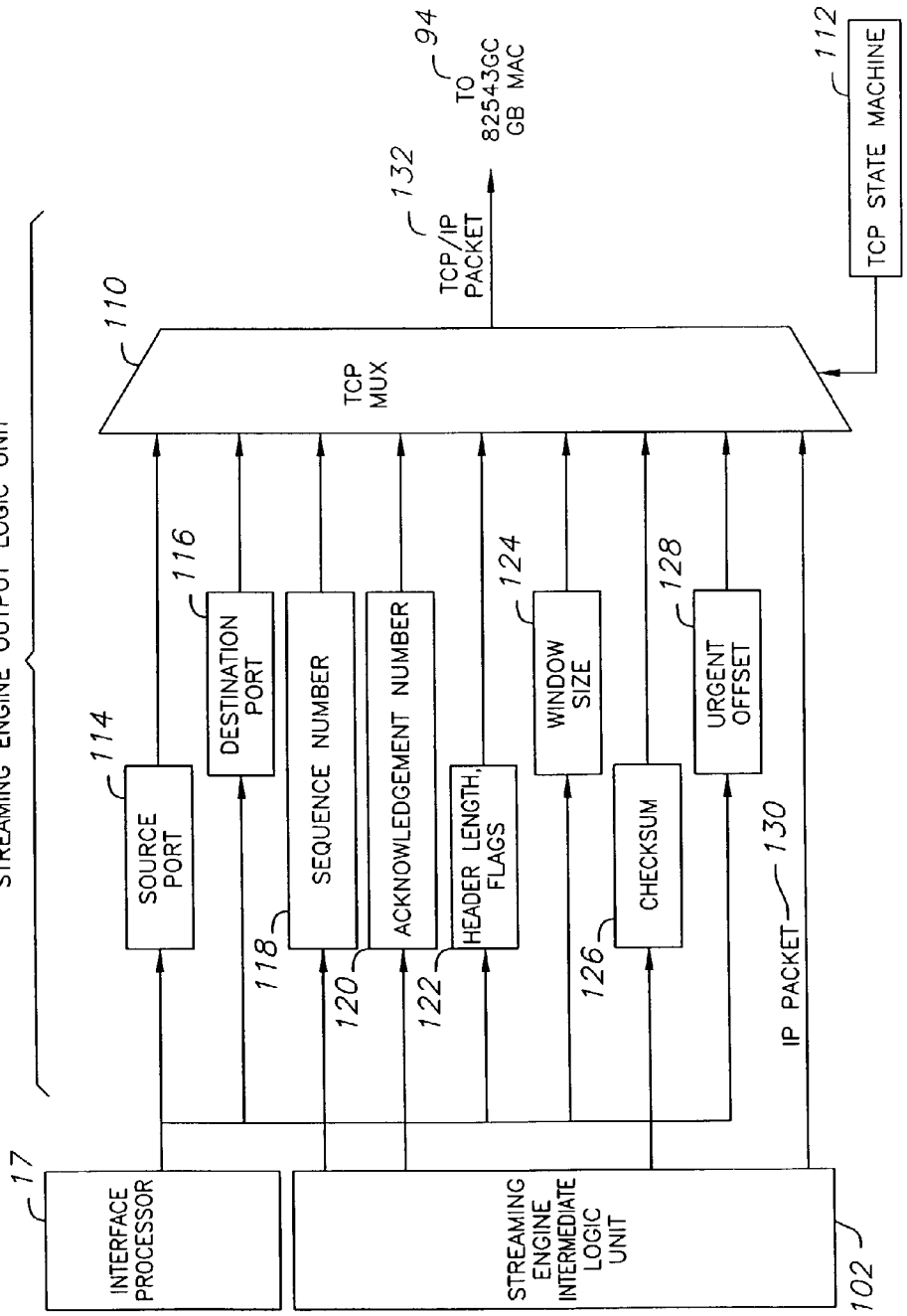
FIG. 10 is a block diagram of a streaming engine output logic unit in accordance with an exemplary embodiment of the present invention.

FIGS. 8–10 are more detailed schematic block diagrams of the streaming engine 19 according to one embodiment of the invention. According to the illustrated embodiment, the streaming engine 19 includes a streaming engine input logic unit 100, a streaming engine intermediate logic unit 102, and a streaming engine output logic unit 104. The streaming engine input logic unit 100, streaming engine intermediate logic unit 102, and streaming engine output logic unit 104 may be embodied within a single streaming ASIC 92 chip.

As illustrated in FIG. 9, the streaming engine input logic unit 100 includes an IP multiplexer 106 in combination with an IP state machine 108. Both the interface processor 17 and host interface 11 electrically interface with inputs to the IP multiplexer 106 via separate 16-bit data buses. The output of the IP multiplexer 106 electrically interfaces with the streaming engine intermediate logic unit 102 via a 16-bit data bus. The storage engine intermediate logic unit 102 also electrically interfaces with the interface processor 17 via an additional 16-bit data bus.

As illustrated in FIG. 10, the storage engine intermediate logic unit 102 and interface processor 17 each electrically interface with the inputs to a TCP multiplexer 110 located in the streaming engine output logic unit 104 via separate 16-bit buses. The TCP multiplexer 110 is electrically connected to a TCP state machine 112. The output of the TCP multiplexer is electrically connected to the MAC 94 via a 16-bit data bus.

In operation, the PHI 88a of the interface processor's MAC 88 receives TCP/IP Ethernet protocol serial data from a user's remote computer for storing at least a portion of the data on the storage devices 10. The PHI 88a converts the Ethernet protocol serial data into words of data and the rest of the MAC's digital logic converts the words of data into frames of data that are transferred to the processor 80, MCH 84, and ICH 86, and temporarily stored on the memory 82. The data along with write control information generated by the interface processor 17 is transferred via the ICH 86 to the host interface 11 which passes the data and write control information to one or more storage controller(s) 12 for storing the data in the storage devices 10. The data and write control information is transferred between the interface processor 17 and the host interface 11, between the host interface and storage controller 12, and between the storage controller 12 and plurality of storage devices 10 in a low level protocol format. In the preferred embodiment the low level protocol is the UDMA protocol.

Data which has already been stored on the storage devices may also be read from the storage devices and provided to a user's remote computer. Initially, the interface processor 17 via the MAC 88 receives a signal from the user's remote computer which requests data from the media server. This request, which may take a TCP/IP protocol format, is transferred to the processor 80 which converts the signal requesting data into read control information particular to the requested data. The read control information is transferred via the ICH 86 to the host interface 11 and on to the storage controller 12 and storage devices 10. The read control information transferred between the interface processor 17 and the host interface 11, between the host interface 11 and the storage controller 12, and between the storage controller 12 and the storage devices 10 in a low level protocol format. In the preferred embodiment the low level protocol is the UDMA protocol.

Upon retrieval of the desired data from the storage devices 10, the host interface 11 transfers transfer control information associated with the retrieved data to the ICH 86 in the interface processor 17. The transfer control information is processed by the interface processor 17 and then transferred to the streaming engine 19 where it is input to the streaming ASIC 92. The host interface 11 further transfers the retrieved data to the streaming ASIC 92.

With reference to FIG. 9, the streaming engine input logic unit 100 of the streaming ASIC 92 receives the retrieved data from the host interface 11. The streaming engine input logic unit 100 also receives information needed to regulate the operation of the streaming engine from the interface processor 17. According to one embodiment, such information is generated based on the transfer control information and stored in registers of the interface processor 17. Such values include, but are not limited to, a version number, header length, and type of service information 120, a total IP length 122, identification, flags, and fragment offset information 124, a time to live and protocol values 126, a header checksum 128, a source address 130, and a destination address 132. The streaming engine input logic unit 100 uses these values to generate an intermediate packet 130 of data according to a first protocol format, such as, for example, an IP protocol. According to one embodiment, the intermediate packet 130 is generated in hardware by the IP multiplexer 106 which uses the values from the interface processor 17 to automatically generate a packet header which is combined with the retrieved data received from the host interface 11 based upon the states of the IP state machine 108.

The streaming engine input logic unit 100 transfers the intermediate packet 130 to the streaming engine intermediate logic unit 102. The streaming engine intermediate logic unit also receives information from the interface processor 17. Using this information, the streaming engine intermediate logic unit calculates parameters such as a checksum number 126, a sequence number 118, and an acknowledgment number 120 for the intermediate packet 130. The streaming engine intermediate logic unit transfers the intermediate packet to the streaming engine output logic unit 104.

With reference to FIG. 10, the streaming engine output logic unit 104 automatically generates an output packet of data based on the intermediate packet, parameters calculated by the streaming engine intermediate logic unit 102, and information transferred by the interface processor 17 to the streaming engine output logic unit. According to one embodiment, the TCP multiplexer 110 combines via hardware the intermediate packet 130 generated by the streaming engine input logic unit 100 and the sequence number 118, acknowledgment number 120, and checksum 126 calculated by the streaming engine intermediate logic unit 102, and a source port 114, destination port 116, header length and flags 122, window size 124, and urgent offset 128 provided by the interface processor 17 into an output TCP/IP packet 132 based upon the states of the TCP state machine 112.

The output packet 132 is transferred from the streaming ASIC 92 to a remote user, or transferred from the streaming ASIC 92 to the MAC 94 and then transferred from the MAC to the remote user. According to one embodiment, the streaming engine output logic unit 104 of the streaming ASIC 92 transfers the output TCP/IP packet 132 to the MAC 94 where the MAC's digital logic converts the frames of data in the TCP/IP packet into data words which are further reduced by the PHI 94a to serial data consistent with the TCP/IP Ethernet protocol format. PHI 94a transfers the data to the user's remote computer. While embodiments of the present invention implement the Ethernet TCP/IP protocol, the present invention can easily be adapted to implement other protocols.

The hardware of the streaming engine 19 which automatically generates and removes packet headers as data is transferred between the host interface and a user's remote computer allows for high speed data transfers. The usual bottleneck created by the use of a host processor in generating and removing such packet headers via software may be avoided.

While the invention has been described with reference to its preferred embodiment, it will be appreciated by those skilled in the art that variations may be made without departing from the precise structure or method disclosed herein which, nonetheless, embody the invention defined by the appended claims. For example, although the invention has been described for use with Internet users, it should be appreciated that the media server can be used with any type of server configuration that requires high rates of data transfer, such as for use in any computer network. Also, while the preferred embodiments of the invention data is transferred in the UDMA 100 protocol formation between the interface processor and host interface, between the host interface and storage controller, between the storage controller and storage devices, and between the host interface and streaming engine, other protocols may be used. Furthermore, the streaming engine can be configured to output data in protocol formats other than the Ethernet TCP/IP protocol. Additionally, embodiments of the present invention may allow for transferring data to more than one storage controller and for transferring data to more than one interface computer or streaming engine.

What is claimed is:

1. A data storage and retrieval system comprising:
a plurality of storage devices for storing data; and
a storage controller coupled to the plurality of storage devices, the storage controller including:
an interface logic circuitry providing an interface with the plurality of storage devices for storing and retrieving the data;
a reconstruction logic circuitry for reconstructing data associated with one of the plurality of storage devices; and
a controller logic circuitry coupled to the interface logic circuitry and the reconstruction logic circuitry for controlling the storing, retrieving, and reconstruction of the data;
wherein, the interface logic circuitry, the reconstruction logic circuitry, and the controller logic circuitry reside within a single electronic chip, and
wherein, the controller logic circuitry controls a reading of a first portion of data from a first of the plurality of storage devices and reconstructs a second portion of the data stored in a second of the plurality of storage devices, the reading and reconstructing occurring during a time needed to complete a single revolution of the first storage device.

2. The system of claim 1, wherein the controller logic circuitry performs real-time, hardware based identification of an unresponsive storage device and signals the reconstruction logic circuitry for reconstructing data associated with the unresponsive storage device.

3. The system of claim 1, wherein the controller logic circuitry includes:
a first logic gate receiving a first signal from the plurality of storage devices and outputting a second signal;
a second logic gate receiving the first signal from the plurality of storage devices and outputting a third signal;
a counter coupled to the first logic gate and the second logic gate, the counter being incremented in value or not based on the second signal and the third signal; and
a comparator coupled to the counter, the comparator comparing the value of the counter against a threshold value for enabling or not the reconstruction logic circuitry.

4. The system of claim 1 further comprising a streaming engine including circuitry for automatically formatting in hardware data retrieved from the plurality of storage devices and transmitting the formatted data to a requesting user device.

5. The system of claim 4, wherein the streaming engine includes a first logic circuitry for formatting in hardware the retrieved data to a first format and a second logic circuitry for formatting in hardware the first formatted data to a second format.

6. The system of claim 5, wherein the first format is an internet protocol format and the second format is a transport control protocol format.

7. The system of claim 5, wherein the formatting includes the automatic creation and addition of header data to the retrieved data.

8. The system of claim 1, wherein the controller logic circuitry controls retrieval of a portion of data from the plurality of storage devices, causes reconstruction of an erroneous portion of the data, and further controls storing of the reconstructed data to the plurality of storage devices, wherein the reading and reconstructing occurs during time T and the writing occurs during time T+1, where T>0.

9. A method for controlling access to a plurality of storage devices, the method comprising:
receiving a user request to retrieve data from the plurality of storage devices;
reading a first portion of data from a first of the plurality of storage devices;
identifying an unresponsive storage device storing a second portion of the data;
transmitting a signal for reconstructing the second portion of the data associated with the unresponsive storage device; and
reconstructing the second portion of the data associated with the unresponsive storage device;
wherein, the reading and the reconstructing occur during a time needed to complete a single revolution of the first storage device.

10. The method of claim 9 further comprising automatically formatting in hardware data retrieved from the storage devices and transmitting the formatted data to a requesting user device.

11. The method of claim 10, wherein the formatting comprises formatting the retrieved data to a first format and formatting the first formatted data to a second format.

12. The method of claim 11, wherein the first format is an internet protocol format and the second format is a transport control protocol format.

13. The method of claim 11, wherein the formatting includes the automatic creation and addition of header data to the retrieved data.

14. The method of claim 9, wherein the reconstruction comprises:
   reading a portion of data from the plurality of storage devices;
   reconstructing an erroneous portion of the data; and
   writing the reconstructed data to the plurality of storage devices, wherein the reading and reconstructing occurs during time T and the writing occurs during time T+1, where T>0.

15. In a storage controller system including a plurality of storage devices controlled by a storage controller having a first logic gate, a second logic gate, a counter coupled to the first logic gate and the second logic gate, and a comparator coupled to the counter, a method for controlling access to a plurality of storage devices, the method comprising:
   receiving from the plurality of storage devices a first signal at the first logic gate;
   outputting at the first logic gate a second signal based on the first signal;
   receiving from the plurality of storage devices the first signal at the second logic gate; and outputting at the second logic gate a third signal based on the first signal;
   incrementing a value of the counter or not based on the second signal and the third signal;
   transmitting the value of the counter to the comparator;
   comparing the value of the counter against a threshold value; and
   reconstructing or not data associated with an unresponsive storage device based on the comparison.

16. The method of claim 15, wherein the reconstructing comprises:
   reading a portion of data from the plurality of storage devices;
   reconstructing an erroneous portion of the data; and
   writing the reconstructed data to the plurality of storage devices, wherein the reading and reconstructing occurs during time T and the writing occurs during time T+1, where T>0.

17. The method of claim 16, wherein time T is a time needed for a single revolution of one of the storage devices to complete.

18. A data storage and retrieval system comprising:
   a plurality of storage devices for storing data; and
   a storage controller coupled to the plurality of storage devices, the storage controller including:
      an interface logic circuitry providing an interface with the plurality of storage devices for storing and retrieving the data;
      a reconstruction logic circuitry for reconstructing data associated with one of the plurality of storage devices; and
      a controller logic circuitry coupled to the interface logic circuitry and the reconstruction logic circuitry for controlling the storing, retrieving, and reconstruction of the data;
   wherein, the controller logic circuitry includes a counter, the counter being incremented in value in response to receipt of a particular type of signal from at least one of the plurality of storage devices, the controller logic circuitry enabling the reconstruction logic circuitry based on a comparison of the value of the counter to a threshold value.

* * * * *